United States Patent [19]

Nestler et al.

[11] 4,002,800

[45] Jan. 11, 1977

[54] IMPREGNATION OF MASONRY HAVING A NEUTRALLY OR ACIDLY REACTION SURFACE

[75] Inventors: Heinz Nestler, Niederkassel-Ranzel; Jürgen Amort, Troisdorf; Leo Hans Plankl, Recklinghausen, all of Germany

[73] Assignee: Dynamit Nobel Aktiengesellschaft, Troisdorf, Germany

[22] Filed: Apr. 5, 1974

[21] Appl. No.: 458,488

Related U.S. Application Data

[62] Division of Ser. No. 418,627, Nov. 23, 1973, Pat. No. 3,879,206.

[30] Foreign Application Priority Data

Dec. 1, 1972 Germany .......................... 2258901

[52] U.S. Cl. .............................. 428/447; 428/538; 428/540
[51] Int. Cl.² .......................................... B32B 9/04
[58] Field of Search ....... 117/123 B, 123 C, 123 R, 117/161 ZA, 54; 106/2, 13, 287 SB, 12; 428/538, 540, 447

[56] References Cited

UNITED STATES PATENTS

| | | | |
|---|---|---|---|
| 2,660,736 | 12/1953 | Biefeld | 106/287 |
| 2,721,855 | 10/1955 | Kin | 117/123 |
| 2,832,794 | 4/1958 | Gordon | 106/287 |
| 2,962,390 | 11/1960 | Fain et al. | 106/13 |
| 2,977,249 | 3/1961 | Heyden et al. | 117/123 |
| 3,244,541 | 4/1966 | Fain et al. | 106/2 |
| 3,403,050 | 9/1968 | Chadha | 117/123 |
| 3,419,423 | 12/1968 | Quaal | 117/123 |
| 3,589,917 | 6/1971 | Hedlund | 117/123 |
| 3,711,305 | 1/1973 | Anderson | 106/287 |
| 3,772,065 | 11/1973 | Seiler | 117/123 |
| 3,819,400 | 6/1974 | Plankl et al. | 117/123 |
| 3,832,203 | 8/1974 | Saunders et al. | 106/287 |

FOREIGN PATENTS OR APPLICATIONS

217,548  9/1958  Australia ...................... 106/287 SB

Primary Examiner—Ronald H. Smith
Assistant Examiner—Sadie L. Childs
Attorney, Agent, or Firm—Burgess, Dinklage & Sprung

[57] ABSTRACT

An improvement in a process for the impregnation of masonry with an alcoholic or benzine solution of an alkyltrialkoxysilane or a partial condensation product thereof which improvement involves including in the alcoholic or benzine solution an organofunctional silane having a basic organo group or an alcoholate of silicon, a metal of an element selected from the group consisting of the First Main Group of the Periodic System, a metal of the Second Main Group of the Periodic System, a metal of the Fourth Sub-Group of the Periodic System, and a metal of the Fifth Sub-Group of the Periodic System; an improved composition for the impregnation of masonry comprising a mixture of an alkyltrialkoxysilane or a partial condensation product thereof and an organofunctional silane having a basic organo group or an alcoholate of an element selected from the group consisting of silicon, a metal of the First Main Group of the Periodic System, a metal of the Second Main Group of the Periodic System, a metal of the Fourth Sub-Group of the Periodic System and a metal of the Fifth Sub-Group of the Periodic System.

14 Claims, No Drawings

IMPREGNATION OF MASONRY HAVING A NEUTRALLY OR ACIDLY REACTION SURFACE

This is a division of application Ser. No. 418,627, filed Nov. 23, 1973 and now U.S. Pat. No. 3,879,206.

BACKGROUND OF THE INVENTION

1. Field of the Invention

This invention relates to an improved composition useful in the impregnation of masonry particularly masonry surfaces having a neutral or weakly acid characteristic, more especially the surfaces whose alkalinity has been produced by environmental influences. More particularly, this invention is directed to decreasing the water absorption characteristics of such masonry surfaces by an improved process wherein an alcoholic or benzine solution of an alkyltrialkoxysilane is employed as an impregnating agent, the improvement residing in including in such a solution an organofunctional silane having a basic organic group or an alcoholate of an element selected from the group consisting of silicon, a metal of the First Main Group of the Periodic System, a metal of the Second Main Group of the Periodic System, a metal of the Fourth Sub-Group of the Periodic System and a metal of the Fifth subgroup of the Periodic System.

DISCUSSION OF THE PRIOR ART

In U.S. application Ser. No. 153,115 impregnating agents have been described for masonry and inorganic oxides, said agents being based on solutions, in alcohol or hydrocarbons, of organosilicon compounds, especially alkyltrialkoxysilanes or their partial condensation products having 0 to 2 alkoxy groups per silicon atom. The material to be treated is to be understood to be any inorganic substances having hydroxyl-group-containing components in any form at which Si-O bonds may form, and which have a porous surface. These include concrete, plaster, calcareous sandstone, bricks, and the like.

With regard to the silane that is used, the hydrolysis of the alkoxy groups is necessary in order to achieve the desired impregnation and the hydrophobation connected therewith, the moisture of the treated substrate and of the air normally sufficing for this purpose. Furthermore since most of the masonry treated has a more or less alkaline characteristic, the hydrolysis is completed within a sufficiently short time for practical requirements. The above-named building materials also have a sufficiently large number of hydroxyl groups at the surface, as a rule, to serve as points of attack for the alkoxy groups of the silane molecules.

The procedure described in U.S. Ser. No. 153,115, now U.S. Pat. No. 3,772,065 however, does not bring the desired success if the surface of the masonry being treated does not permit the most rapid possible hydrolysis of the alkoxy groups of the silane or if the surface does not have sufficient hydroxyl groups to which the silane molecules can anchor themselves. These characteristics unfavorable to the impregnation are possessed by many building materials of their very nature, such as for example many sandstones which have a neutrally reacting surface, or masonry whose surface has been neutralized or even has a weakly acid reaction due to environmental influences.

It has become desirable, therefore, to improve upon the impregnation characteristics of the alkyltrialkoxysilanes heretofore employed so as to render surfaces including in particular neutral or weakly acid surfaces or surfaces which are low in alkalinity, low in water absorption characteristics. In particular it has become desirable to provide a substance which can favorably treat such surfaces whereby to coat the same so that its tendency to absorb water is markedly reduced.

SUMMARY OF THE INVENTION

The present invention is an improvement in a process for impregnating masonry surfaces with an alcoholic or hydrocarbon solution of an alkyltrialkoxysilane or a partial condensation product thereof which improvement resides in including in said solution a catalytically acting organofunctional silane having a basic organo group or an alcoholate of an element selected from the group consisting of silicon, a metal of the First Main Group of the Periodic System, a metal of the Second Main Group of the Periodic System metal of the Fourth Sub-Group of the Periodic System and a metal of the Fifth Sub-Group of the Periodic System.

It has been discovered that the sorption characteristics of masonry surfaces particularly neutral or weakly acid surfaces or surfaces low in alkalinity can be substantially changed and the water sorption characteristics markedly reduced by impregnating such surfaces with a mixture of alkyltrialkoxysilane and a catalytically acting organofunctional silane having a basic organo group or an alcoholate of an element selected from the group consisting of silicon, a metal of the First Main Group of the Periodic System, a metal of the Second Main Group of the Periodic System, a metal of the Fourth Sub-Group of the Periodic System and a metal of the Fifth Sub-Group of the Periodic System. Mixtures of alcoholates can be employed as well as mixtures of organofunctional silanes with alcoholates.

It has been discovered that improved results in decreasing the water absorption characteristics of masonry surfaces can be provided when the impregnating solution contains an alkyltrialkoxysilane or a partial condensation product thereof together with, as an additive, a silane or alcoholate as above defined. The additive can be present in virtually any amount although amounts between 5 and 95% based upon the weight of the alkyltrialkoxysilane or partial condensation product thereof are suitable. Preferably the additive, i.e., the organofunctional silane or the alcoholate is present in an amount between 10 and 70% based upon the combined weight of alkyltrialkoxysilane or partial condensation product and additive.

The additives affect the manner of the operation of the alcoholic or hydrocarbon solution of alkyltrialkoxysilane in a catalytic manner. However, if used alone they have no beneficial effect in decreasing the water sorption characteristics of masonry surfaces. Their partial basic character has been found to promote a catalytic affect on the hydrolysis of the alkyltrialkoxysilane and to assist in the anchoring of such alkyltrialkoxysilane to the masonry substrate. The basicity of these additives, however, is not an essential requirement for the catalytic activity, since even neutrally active compounds of the described types of compounds exhibit this desired effect. It should be understood that the present invention is not to be construed as limited to the theoretical explanations above for the synergistic effect provided by the mixture of additive and alkyltrialkoxysilane.

With respect to the amount of these additives, or the ratio in which they are mixed with the alkyltrialkoxysilane, consideration should be given to the nature of the material to be treated especially its physical properties. Virtually all ratios of additive to alkyltrialkoxysilane can be employed. In many cases the addition of 1 to 2% with reference to the alkyltrialkoxysilane suffices. However, amounts of even up to about 100%, with reference to the silane, may be used. The amounts stated above represent generally the range in which the amount of additive will fall.

In use the additives are best added to the solution of alkyltrialkoxysilane and the common solution is impregnated. However, it is possible to first impregnate the masonry surface with an alcoholic or hydrocarbonaceous solution of additive and follows such treatment within a short period of time, say no longer than about 20 minutes, with a subsequent treatment with the hydrocarbonaceous solution of alkyltrialkoxysilane or partial condensation product thereof. Similarly, the solution of alkyltrialkoxysilane or condensation product thereof can be initially applied to the surface and the same can be followed, say within 20 minutes with a subsequent treatment of alcoholic or hydrocarbonaceous solution of additive. However, the most preferred manner of treating the masonry surface is to utilize a common solution of alkyltrialkoxysilane or partial condensation product thereof and additive.

DESCRIPTION OF PREFERRED EMBODIMENTS

In the treatment of masonry surfaces in accordance with the invention numerous different alcoholates can be utilized in addition to the alkyltrialkoxysilanes or their partial condensation products. These alcoholates should be at least partially soluble in the solvent employed. Preferably they should be soluble in alcohols or paraffinic hydrocarbons in which the alkyltrialkoxysilane is soluble. These alcoholates improve the hydrophobation achieved by the silanes, especially on those substances which do not exhibit a strong alkaline characteristic. These latter surfaces include sandstones and carbonized concrete. Moreover, the use of these additives does not harm the substrate and no undesirable directory action of the alcoholate with the substrate occurs.

Additionally, all of the alcoholates which can be employed are characterized by being readily hydrolyzable, i.e., even the humidity of the air or the minor quantities of water on the substrate are sufficient to affect their hydrolysis. The molecular fragments which remain from the alcoholate hydrolysis can be removed by washing although, if desired, such molecular components can be incorporated into the molecular structure of the substrate itself. Hence, in any event, no undesirable residues remain on the substrate subsequent to the impregnation.

The organofunctional silanes having basic organogroups, which are to be used according to the invention, include alkoxysilanes having one or two alkyl or aryl groups directly on the silicon atom, of which at least one is to have basically reacting radicals such as the amino group, for example. Such an amino group can also be further substituted provided that the entire substituted amino group still has a basic reaction, i.e., has a basic characteristic. The alkyl group on the silicon atom is preferably one having 3 to 6 carbon atoms; the preferred aryl group will be the phenyl group.

Examples of such organofunctional silanes are: β-amino-α-methylethyltriethoxysilane, γ-aminopropyltriethoxysilane, δ-aminobutyltrimethoxysilane, ω-aminohexyltriethoxysilane, γ-aminopropylmethyldiethoxysilane, γ-aminopropylphenyldiethoxysilane, N-methyl-γ-aminopropyltriethoxysilane, N,N-dimethyl-γ-aminopropyltriethoxysilane, N-γ-aminopropyl-δ-aminobutyltriethoxysilane, N-β-aminoethyl-γ-aminopropyltriethoxysilane, N-(γ-triethoxysilylpropyl)-aniline, N-methyl-N-(γ-triethoxysilylpropyl)-aniline, and N-(γ-triethoxysilylpropyl)-α-naphthylamine.

By alcoholates of silicon are meant silicic acid esters, their partial condensation products or their dialkali salts. The ester component is to include alkyl radicals having 1 to 8 carbon atoms and/or mononuclear or dinuclear phenyl radicals or cycloalkyl radicals having up to 8 carbon atoms. The partial condensation products are partial hydrolyzates having preferably 2 to 10 -[Si-O-] units per molecule, the two remaining valences of the silicon atom being occupied by alkoxy groups or by (MeO) groups, Me representing an alkali metal especially sodium and potassium.

The alcoholates of metals of the First and Second Main group of the Periodic System have straight-chained or branched alkyl alcohols with preferably 1 to 6 carbon atoms as their alcohol component. Examples are: sodium ethylate, sodium isopropylate, potassium-tert.-butylate, magnesium ethylate and calcium ethylate.

The alcohol components of the alcoholates of metals of the Fifth and Fourth Sub-Group of the Periodic System include in particular alcoholates of titanium, zirconium and vanadium. The alcohol portion of the alcoholate are the same alcohols employed in the case of alkali or alkaline earth metal alcoholates and include in particular alkyl alcohols, both straight-chained or branch-chained, having 1 to 6 carbon atoms. These compounds are often known as trans-esterification catalysts and are also called metallic acid esters. They include isopropyl titanate, butyl titanate, propyl zirconate, vanadyl butylate and the like.

The impregnating composition of the present invention is particularly useful in the treatment of silicatic material whose surface has a neutral or weakly acid reaction or whose alkalinity has been reduced by environmental influences. Such surface can be made of a natural material or a material made by the processing of natural rock.

Natural construction materials which have a neutral or weakly acid reaction and can be impregnated in accordance with the invention include sandstones, granites, mottled sandstones, marl, slate, etc.

Products which are made by processing natural rock are essentially such building materials as cement, concrete, all kinds of plaster, bricks and tiles, etc. These building materials have neutral or weakly acid reactions at their surfaces if they are exposed to environmental influences of a natural, civilizational or industrial origin. The following are examples of such environmental influences: the carbon dioxide content of the air, $SO_2$ or $H_2S$ in volcanic regions, gases from fumaroles or geysers; also industrial exhausts such as smoke gases, $SO_2$, $CO_2$, automobile exhausts, gases from the combustion of home heating fuels.

Additionally, natural rock whose surface has acquired a neutral or weakly acid reaction due to the above-named environmental influences can be impregnated by the method of the invention.

In order to more fully illustrate the nature of the invention and the manner of practicing the same the following Examples are presented. In these Examples comparative tests are set forth which demonstrate the relative effectiveness of the additives of the present invention versus compositions according to the prior art. To facilate comparison, all of the solutions used, as mentioned below, were adjusted to a content of 40% of active substance.

EXAMPLE 1

Concrete prisms (base 10 × 10 cm., height 3 cm., weight approx. 600 g.) of Quality B 300 according to Deutsche Industrie-Normen 1045 were heavily carbonated on their surface by long exposure in a $CO_2$ atmosphere. These blocks were exposed to a water loading of 10 cm. water column, part of them untreated (I), part treated with a 40% alcoholic solution of butyl trimethoxysilane (II) and part treated with a solution which contained 35% butyltrimethoxysilane and 5% γ-aminopropyltriethoxysilane in ethanol (III) (all percentages are percentages by weight).

The following amounts of water were absorbed (in weight-percent with reference to the dry weight of the blocks), the maximum and minimum values of each series being stated:

|  | After 24 h. | After 48 h. | After 72 h. |
|---|---|---|---|
| Series I | 1.10 – 1.33 | 1.41 – 1.67 | 1.59 – 1.86 |
| Series II | 0.42 – 0.51 | 0.59 – 0.60 | 0.67 – 0.71 |
| Series III | 0.31 – 0.36 | 0.38 – 0.44 | 0.45 – 0.52 |

After three weeks of lying in the air, after the blocks had returned to their initial weight, the water soaking was repeated, the following weight increases resulting:

|  | After 24 h. | After 48 h. | After 72 h. |
|---|---|---|---|
| Series I | 1.12 – 1.26 | 1.30 – 1.44 | 1.39 – 1.50 |
| Series II | 0.47 – 0.60 | 0.58 – 0.71 | 0.67 – 0.79 |
| Series III | 0.31 – 0.35 | 0.37 – 0.46 | 0.42 – 0.53 |

EXAMPLE 2

Ashlars of a sandstone from Switzerland (source A) of entirely neutral reaction, (size approx. 7.5 × 4 × 2 cm., weight approx. 160 g) were treated. Whereas Series IV remained untreated, Series V, VI and VII were impregnated in the following manner with ethanolic solutions:

V: 40% butyltrimethoxysilane solution
VI: 35% butyltrimethoxysilane and 5% γ-aminopropyltriethoxysilane
VII: 35% butyltrimethoxysilane and 5% n-butyltitanate.

By measuring the time it takes for a drop of water to penetrate it can easily be shown that all three impregnations of the stone were water-repellent. While the untreated sandstone surface absorbs a water drop in 22 minutes, the absorption on all of the impregnated surfaces took longer than 60 minutes at which limitation observation was discontinued.

The substantially more severe experimental conditions of immersion in water under 10 cm. of water column clearly shows the differences between the various impregnations. The amount of water absorbed, expressed as a percentage of the dry weight of the rock was:

|  | After 24 h. | After 48 h. | After 72 h. |
|---|---|---|---|
| Series IV | 1.7 | 1.8 | 1.9 |
| Series V | 1.4 | 1.7 | 1.8 |
| Series VI | 0.5 | 0.8 | 1.1 |
| Series VII | 0.5 | 0.8 | 1.0 |

The above values are averages of several experimental series.

EXAMPLE 3

This example is intended to illustrate the apparently catalytic influence of the additives described and to show that the improvement of the hydrophobative action is not merely a superimposition of two effects. A partially condensed silicic acid ethyl ester ($SiO_2$ content 40%) was selected as the additive; the material to be treated was of an entirely neutral reaction and very low absorptivity (rather irregularly shaped bodies of an average weight of 150 g).

In addition to an untreated rock (VIII) the rocks impregnated as follows were tested:

IX: 40% solution of butyltrimethoxysilane in ethanol
X: 40% solution of partially condensed silicic acid ethyl ester in ethanol.
XI: solution of 20% butyl trimethoxysilane plus 20% partially condensed silicic acid ethyl ester in ethanol.

The treatment was performed as usual by allowing the solutions to act on the sandstone rocks for one minute and exposing them to air for 14 days.

The penetration time of a drop of water was:

| Specimen VIII | 45 minutes |
|---|---|
| Specimen IX | 50 minutes |
| Specimen X | 10 minutes |
| Specimen XI | 210 minutes |

In the water soaking test under 10 cm. of water column the following amounts of water were absorbed (percentage by weight of the dry rock weight):

| After | 24 hours | 48 hours | 72 hours | 240 hours |
|---|---|---|---|---|
| Rock VIII | 5.2 | 5.5 | 5.6 | 6.1 |
| Rock IX | 5.2 | 5.3 | 5.4 | 5.7 |
| Rock X | 5.0 | 5.1 | 5.2 | 5.6 |
| Rock XI | 0.5 | 0.6 | 0.7 | 1.1 |

The water soaking test was repeated twice at intervals of 14 days, after the rocks had meantime returned to their initial weight by drying in the air, with the following results:

| 1st repetition | 24 hours | 48 hours | 72 hours | 240 hours |
|---|---|---|---|---|
| Rock VIII | 5.6 | 5.8 | 6.0 | 6.4 |
| Rock IX | 5.3 | 5.4 | 5.5 | 5.8 |
| Rock X | 5.3 | 5.4 | 5.5 | 5.7 |
| Rock XI | 0.4 | 0.5 | 0.6 | 1.1 |
| 2nd repetition |  |  |  |  |
| Rock VIII | 5.6 | 5.8 | 6.0 | 6.6 |
| Rock IX | 5.2 | 5.4 | 5.5 | 5.9 |
| Rock X | 5.3 | 5.5 | 5.5 | 5.8 |
| Rock XI | 0.3 | 0.5 | 0.7 | 1.2 |

EXAMPLE 4

Upon the conclusion of Example 3, in order to show in another manner that it is not merely an aggregative effect that takes place here but an interaction, even in the case of neutrally reacting additives as in Example 3, a sandstone rock which had been pre-treated in the same manner as rock X was subjected two months after the first treatment to a second impregnation with a 40% solution of butyltrimethoxysilane in ethanol and let stand under 10 cm. of water column. The water absorption amounted to:

| After | 24 hours | 48 hours | 72 hours | 240 hours |
|---|---|---|---|---|
| Rock XII | 5.3 | 5.4 | 5.5 | 5.7 |

EXAMPLE 5

On sandstone of source B other additives were tested, parallel to the specimens of Example 3, for their activity, namely impregnating solutions of the following composition:

XIII: 35% butyltrimethoxysilane plus 5% β-aminopropyltriethoxysilane in ethanol

XIV: 35% butyltrimethoxysilane plus 5% butyltitanate in ethanol.

When these stones were let stand under 10 cm. of water column the following weight increases were recorded:

|  | After 24 h. | 48 h. | 72 h. |
|---|---|---|---|
| Rock XIII | 0.5% | 0.6% | 0.7% |
| Rock XIV | 0.8% | 1.3% | 1.8% |

The information given in Example 3 will serve for comparison.

The solvents employed for the alkyltrialkoxysilanes and the additives are generally alcoholic or hydrocarbonaceous solvents. Especially contemplated are alcoholic solvents of C1-C8 alcohols, both monovalent and polyvalent alcohols of which ethanol, methanol, propanol and butanol are prime examples. Numerous hydrocarbon solvents are contemplated; in particular benzene, toluene, xylene, hexane, pentane, octane, 2-ethylhexane and the like. Mixtures of hydrocarbon such as benzine are particularly contemplated. The alkyltrialkoxysilane together with the additive can be dissolved, typically, in a petroleum distillate or a mixture of petroleum refinery streams. For instance, it can be dissolved with kerosene, gasoline, natural gasoline and certain mixtures of hydrocarbons.

EXAMPLES 6 and 7

Sandstone of the provenance B is treated in the same manner as in Example 5 with the following solutions:

rock XV.: 35% butyltrimethoxysilane plus 5% butylzirconate in ethanol rock XVI: 35% butyltrimethoxysilane plus 5% propylvanadat in ethanol The weight increases after treatment with water as follows:

|  | after 24 h | 48 h | 72 h |
|---|---|---|---|
| rock XV.: | 0,7% | 1,2% | 1,7% |
| rock XVI: | 0,7% | 1,4% | 1,9%. |

What is claimed is:

1. In a process of contacting masonry with an alcoholic or hydrocarbonaceous solution of an alkyltrialkoxysilane or a partial condensation product thereof, the improvement which comprises including in said solution as an additive a composition selected from the group consisting of an organofunctional silane having a basic organo group and an alcoholate of silicon, a metal of the First Main Group of the Periodic System, a metal of the Second Main Group of the Periodic System, a metal of the Fourth Sub-Group of the Periodic System or a metal of the Fifth Sub-Group of the Periodic System.

2. A process according to claim 1 wherein the masonry surface is one having a neutrally or acidly acting surface.

3. A process according to claim 2 wherein an organofunctional silane is employed, said silane being an aminoalkylsilane, said silane being present in amount of at least 1% by weight based upon the amount of alkyltrialkoxysilane.

4. A process according to claim 3 wherein said aminoalkylsilane is selected from the group consisting of β-amino-α-methylethyltriethoxysilane, γ-aminopropyltriethoxysilane, δ-aminobutyltrimethoxysilane, ω-aminohexyltriethoxysilane, γ-aminopropylmethyldiethoxysilane, γ-aminopropylphenyldiethoxysilane, N-methyl-γ-aminopropyltriethoxysilane, N,N-dimethyl-γ-aminopropyltriethoxysilane, N-γ-aminopropyl-δ-aminobutyltriethoxysilane, N-β-aminoethyl-γ-aminopropyltriethoxysilane, N-(γ-triethoxysilylpropyl)-aniline, and N-(γ-triethoxysilylpropyl)-α-naphthylamine.

5. A process according to claim 2 wherein an alcoholate of silicon is employed, said alcoholate being selected from the group consisting of silicic acid esters, partial condensation products of silicic acid esters and dialkali salts of silicic acid esters.

6. A process according to claim 5 wherein the silicic acid ester has as the ester component a group selected from the group consisting of alkyl radicals having 1 to 8 carbon atoms, mononuclear aromatic radicals, binuclear aromatic radicals and cycloalkyl radicals having up to 8 carbon atoms.

7. A process according to claim 6 wherein the aromatic radicals are mononuclear or binuclear phenyl radicals.

8. A process according to claim 2 wherein an alcoholate of a metal of the First Main Group of the Periodic System is employed.

9. A process according to claim 8 wherein said alcoholate is selected from the group consisting of sodium ethylate, sodium isopropylate and potassium-tert. butylate.

10. A process according to claim 2 wherein an alcoholate of a metal of the Second Main Group of the Periodic System is employed.

11. A process according to claim 2 wherein an alcoholate of a metal of the First or Second Main Group of the Periodic System is employed, said alcoholate being a straight-chained or branch — chained alkyl alcohol having from 1 to 6 carbon atoms in the alcohol component.

12. A process according to claim 2 wherein an alcoholate of a metal of the Fifth or Sixth Sub-Group of the Periodic System is employed, said alcoholate being a straight-chained or branch-chained alkyl alcohol having from 1 to 6 carbon atoms in the alcohol component.

13. A process according to claim 12 wherein said alcoholate is selected from the group consisting of isopropyltitanate, butyltitanate, propylzirconate and vanadyl butylate.

14. A process according to claim 12 wherein the alcoholate is an alcoholate of a metal selected from the group consisting of titanium, zirconium and vanadium.

* * * * *

UNITED STATES PATENT AND TRADEMARK OFFICE
CERTIFICATE OF CORRECTION

PATENT NO. : 4,002,800
DATED : January 11, 1977
INVENTOR(S) : Heinz Nestler et al It is certified that error appears in the above-identified patent and that said Letters Patent are hereby corrected as shown below:

Column 6, line 19, after "was" insert -- "Baumberger Sandstein" (source B) --.

Signed and Sealed this

Fifth Day of April 1977

[SEAL]

Attest:

RUTH C. MASON
Attesting Officer

C. MARSHALL DANN
Commissioner of Patents and Trademarks